United States Patent [19]

Small

[11] Patent Number: 4,743,050
[45] Date of Patent: May 10, 1988

[54] SHOPPING CART CLIPBOARD

[76] Inventor: LaRue D. Small, Woodlyn Hills, Algona, Iowa 50511

[21] Appl. No.: 78,196

[22] Filed: Jul. 27, 1987

[51] Int. Cl.⁴ .............................................. B42F 7/00
[52] U.S. Cl. ...................................................... 281/45
[58] Field of Search ............................... 281/1, 42, 45; 402/80 R, 80 L; 211/54.1

[56] References Cited

U.S. PATENT DOCUMENTS

| | | | |
|---|---|---|---|
| 4,156,318 | 5/1979 | Economy | 40/308 |
| 4,369,948 | 1/1983 | Krauss et al. | 281/45 X |
| 4,423,888 | 1/1984 | Addison | 281/45 |
| 4,666,409 | 5/1987 | Sandberg | 281/45 X |
| 4,685,701 | 8/1987 | Amundson et al. | 281/45 X |
| 4,694,595 | 9/1987 | Fast | 211/54.1 X |

Primary Examiner—Paul A. Bell
Attorney, Agent, or Firm—Henderson & Sturm

[57] ABSTRACT

A shopping cart clipboard adapted to be attached to various conventional shopping carts, and being movable between a horizontal working position and a vertical stored position. The clipboard includes a planar surface that carries a spring biased clip to secure materials on the surface. The planar surface is part of a clipboard assembly that is attached to a cart bracket by engagement of a portion of the clipboard assembly in an elongated slot formed in the bracket. This structure allows selective movement of the clipboard between the working position and the stored position, while providing for locking the clipboard assembly from removal from the bracket after the bracket is attached to the shopping cart.

4 Claims, 2 Drawing Sheets

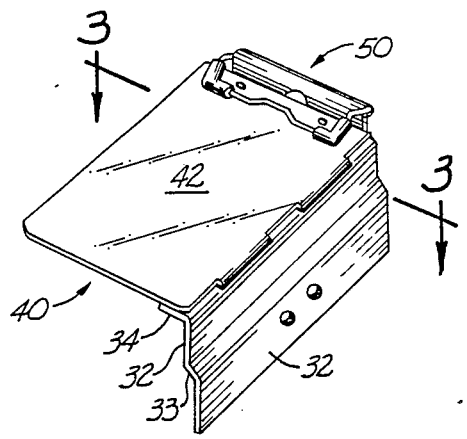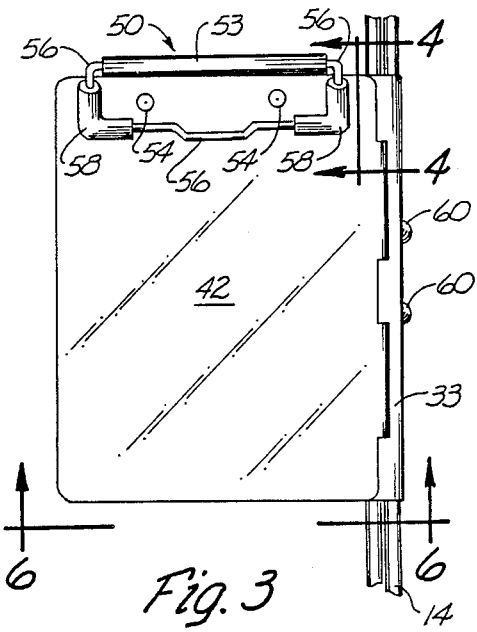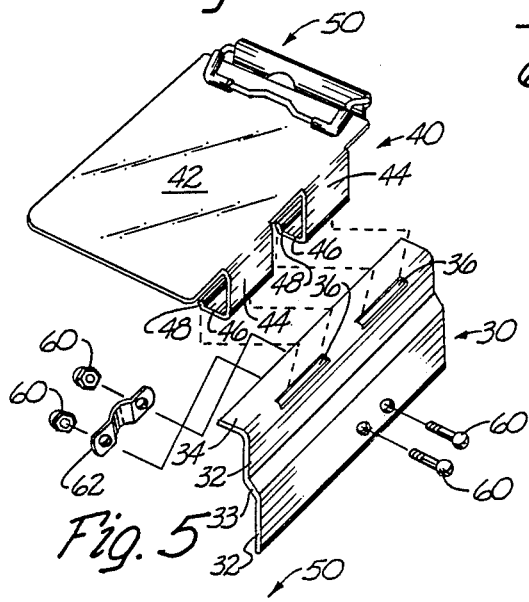

SHOPPING CART CLIPBOARD

TECHNICAL FIELD

This invention relates to shopping cart attachments, and more particularly to a clipboard adapted for use in conjunction with conventional shopping carts.

BACKGROUND ART

Shoppers typically have shopping lists, notes, coupons and other items which they periodically refer to when shopping. Although various devices have been used to organize these items, there is no convenient location on the shopping cart to attach these items.

Clipboards are well known, however, none have been successfully adapted for use in conjunction with the variety of shopping carts in current use. Although known shopping cart attachments provide a flat surface for writing or organizing items, all have limitations. Typical limitations of known devices include instability of the flat surface, interference of the device with the use of infant seats and with nesting of carts, and inability to adapt for use on carts of varying designs.

Those concerned with these and other problems recognize the need for an improved shopping cart clipboard.

DISCLOSURE OF THE INVENTION

The present invention provides a shopping cart clipboard adapted to be attached to various conventional shopping carts, and being movable between a horizontal working position and a vertical stored position. The clipboard includes a planar surface that carries a spring biased clip to secure materials on the surface. The planar surface is part of a clipboard assembly that is attached to a cart bracket by engagement of a portion of the clipboard assembly in an elongated slot formed in the bracket. This structure allows selective movement of the clipboard between the working position and the stored position, while providing for locking the clipboard assembly from removal from the bracket after the bracket is attached to the shopping cart.

When in the working position, the clipboard can be used by the shopper to secure coupons or other materials and to use as a writing surface. When it is not needed for these purposes, the clipboard can be moved to the vertical stored position where the clipboard will not interfere with the folding or nesting of the shopping carts. When in either position, the clipboard does not interfere with the operation and use of the infant seat that is part of many conventional carts.

An object of the present invention is the provision of an improved shopping cart clipboard.

Another object is to provide a shopping cart clipboard that is simple in structure and inexpensive to manufacture.

A further object of the invention is the provision of a shopping cart clipboard that is easily moved between the working position and the stored position.

Still another object is to provide a shopping cart clipboard that is inexpensive to maintain.

A still further object of the present invention is the provision of a shopping cart clipboard that is easily adapted for use with conventional shopping carts.

Yet another object is to provide a shopping cart clipboard that does not interfere with the use of conventional infant seats.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 2 is a perspective view of the clipboard detached from a shopping cart;

FIG. 3 is an enlarged top plan view taken along line 3—3 of FIG. 2;

FIG. 4 is an enlarged side elevation sectional view taken along line 4—4 of FIG. 3 showing the attachment of the spring biased clip to one edge of the clipboard;

FIG. 5 is an exploded perspective view showing the relative positions of the cart bracket, the fastening means, and the clipboard assembly;

FIG. 6 is a front elevation sectional view taken along line 6—6 of FIG. 3 showing the clipboard locked in the horizontal working position by engagement of the support section of the clipboard assembly with the vertical plate of the cart bracket;

FIG. 7 is a front elevational view similar to FIG. 6 but showing the support section raised to disengage from the vertical plate, thereby freeing the clipboard to pivot as indicated by the directional arrows;

FIG. 8 is a front elevational view similar to FIG. 6, but showing the clipboard moved to the vertical stored position.

BEST MODE FOR CARRYING OUT THE INVENTION

Figure 1:
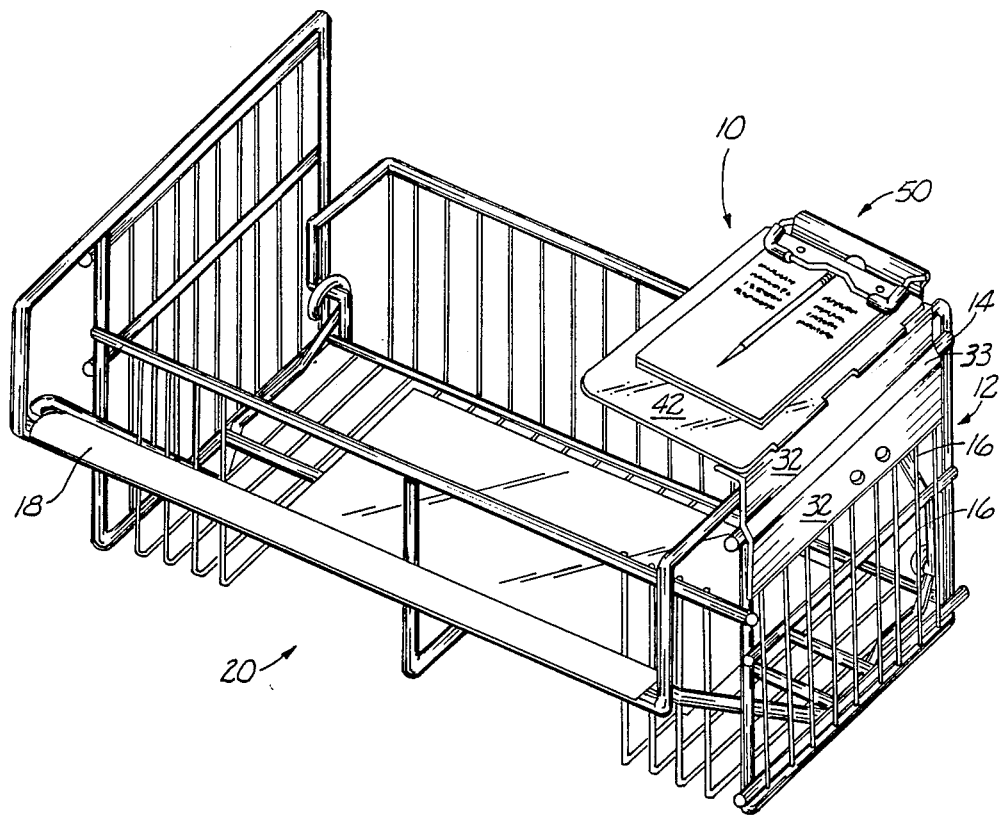
FIG. 1 is a perspective view of the clipboard of the present invention attached to a conventional shopping cart.

Referring now to the drawings, wherein like reference numerals designate identical or corresponding parts throughout the several views, FIG. 1 shows the clipboard (10) of the present invention attached to a conventional shopping cart (12). The cart (12) is constructed of a number of horizontal rails (14) and vertical rails (16) attached to form the sidewalls of the shopping cart (12). FIG. 1 illustrates the portion of the cart (12) that includes the handle (18) and the infant seat (20).

As best shown in FIG. 5, the clipboard (10) includes a cart bracket (30), and a clipboard assembly (40). The bracket (30) includes a vertical plate (32) having an offset section (33), a horizontal plate (34), and elongated slots (36) formed at the juncture of the vertical plate (32) and the horizontal plate (34). The clipboard assembly (40) includes a planar surface (42), a support section (44), a return section (46) and a locking section (48).

As shown in FIGS. 6-9, the planar surface (42) carries a biased clip (50). the support section (44) extends normal to the planar surface (42) and the return section (46) extends normal to the support section (44). The locking section (48) extends from the return section (46) back toward the planar surface (42).

As most clearly shown in FIGS. 3 and 4, the biased clip (50) includes a bracket (52) attached by rivets (54) to the planar surface (42). The bracket (52) includes an upper circular channel (53) that receives the ends of clip rod (56). Torsion springs (58) are attached to the ends of clip rod (56) in the channel (53) such that the clip rod (56) is biased toward the planar surface (42). The corners of the clip rod (36) near the planar surface (42) are covered by slip resistant sleeves (58).

Figure 9:
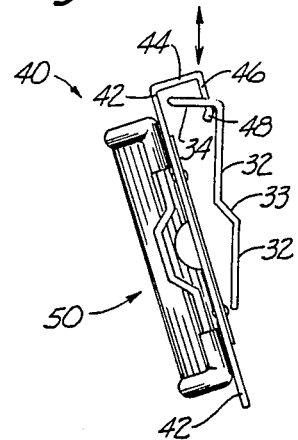
FIG. 9 is a front elevational view similar to FIG. 6, but showing the planar surface of the clipboard assembly positioned in close proximity to the vertical plate of the cart bracket so that the locking section can move into and out of the elongated slot as indicated by the directional arrows.

In operation, the clipboard assembly (40) and the cart bracket (30) are positioned as shown in FIG. 9 so that the locking section (48) can be received in the elongated slots (36). The cart bracket (30) is then attached to the cart (12) by fasteners (60) and strap (62) as illustrated in FIGS. 6–8. When attached to the cart (12), the clipboard assembly (40) and the cart bracket (30) cannot be separated since the cart structure is positioned between them. The cart structure thus prevents the planar surface (42) from being positioned in near proximity to the vertical plate (32) as illustrated in FIG. 9. Therefore, the locking section (48) cannot be aligned to pass out through the elongated slot (36).

Once attached, the clipboard (10) can be positioned in the horizontal working position shown in FIG. 6, or lowered to the vertical stored position shown in FIG. 8. When in the working position, the clipboard (10) is supported by engagement of the support section (44) with a portion of the vertical plate (32). In the working position, the clipboard (10) can be used to support various items, such as coupons, notes, shopping lists, and checkbooks.

To move the clipboard (10) from the working position (FIG. 6), to the stored position (FIG. 8), the shopper merely raises the support section (44) in the slot (36), and pivots the clipboard (10) as indicated by the directional arrows in FIG. 7. In the stored position, the support section (44) engages the horizontal plate (34) of the cart bracket (30).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A clipboard in combination with a shopping cart, the improvement comprising:
  a cart bracket including a vertical plate attached to said shopping cart and disposed to extend upwardly therefrom, a horizontal plate extending from the top of said vertical plate, and an elongated slot formed in said horizontal plate near the juncture of said vertical plate and said horizontal plate;
  a clipboard assembly including:
    a planar surface having a biased clip attached thereto,
    a support section extending generally normal to said planar surface,
    a return section extending generally normal to said support section and being disposed generally parallel to said planar surface, and
    a locking section extending from said return section toward said planar surface and terminating in spaced relationship thereto,
  said clipboard assembly being selectively attached to said bracket by extending said locking section, said return section, and said support section through said slot;
  said planar surface being relatively movable between a horizontal working position wherein said support section engages the vertical plate of the bracket, and a vertical stored position wherein said support section engages the horizontal plate of the bracket.

2. The clipboard of claim 1 wherein said locking section is disposed to move into and out of said slot only when said planar surface is positioned in near proximity to the vertical plate of said bracket, thereby locking said clipboard assembly into engagement with said cart bracket when the bracket is attached to a shopping cart wherein the shopping cart is disposed between said bracket and said planar surface when the planar surface is in the vertical stored position.

3. The clipboard of claim 1 wherein said shopping cart includes a horizontally disposed rail and wherein said vertical plate of said cart bracket includes an offset section disposed to contact said horizontal rail thereby supporting said bracket against downward vertical movement.

4. The clipboard of claim 3 wherein said shopping cart further includes vertically disposed rails attached to and extending below said horizontal rail, and wherein said vertical plate of said bracket is attached to said shopping cart by a strap fastened to said vertical plate with the vertical rails disposed therebetween.

* * * * *